Oct. 19, 1954 W. BERTLEFF ET AL 2,691,797
METHOD AND APPARATUS FOR TRIMMING MOLDED ARTICLES
Filed Feb. 10, 1950 2 Sheets-Sheet 2
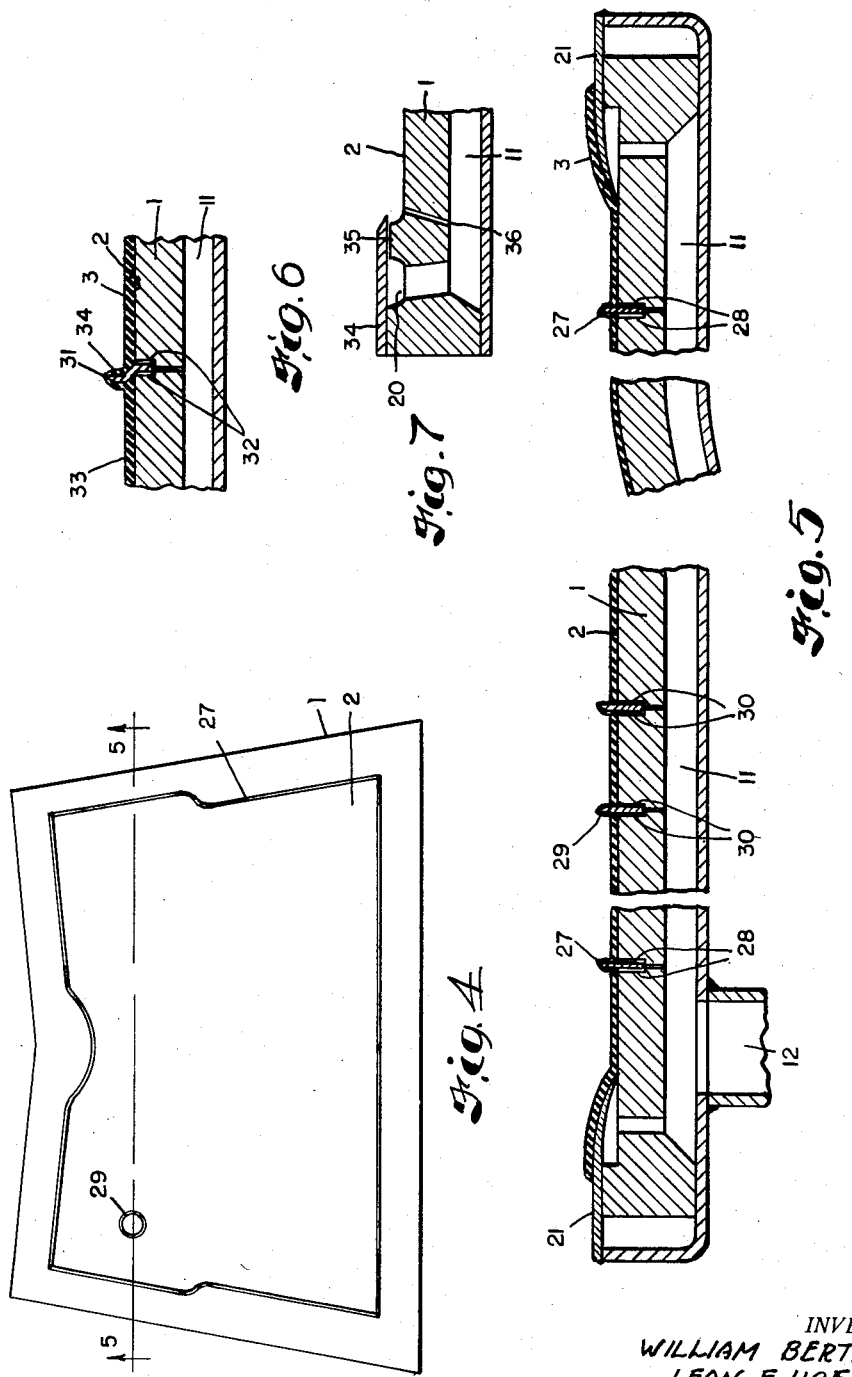
INVENTORS
WILLIAM BERTLEFF +
BY LEON E. HOFFER
Oberlin & Limbach
ATTORNEYS.

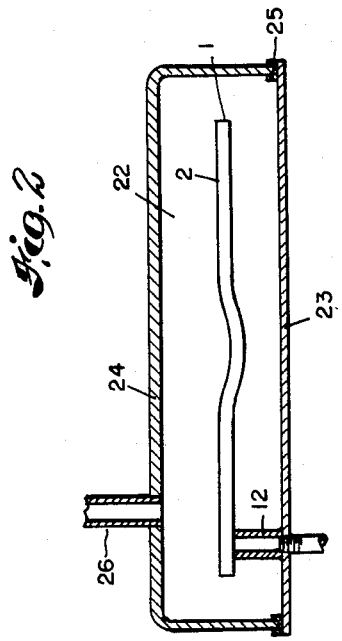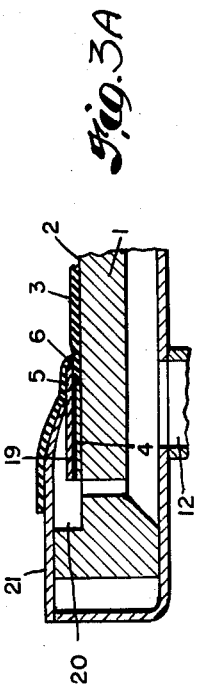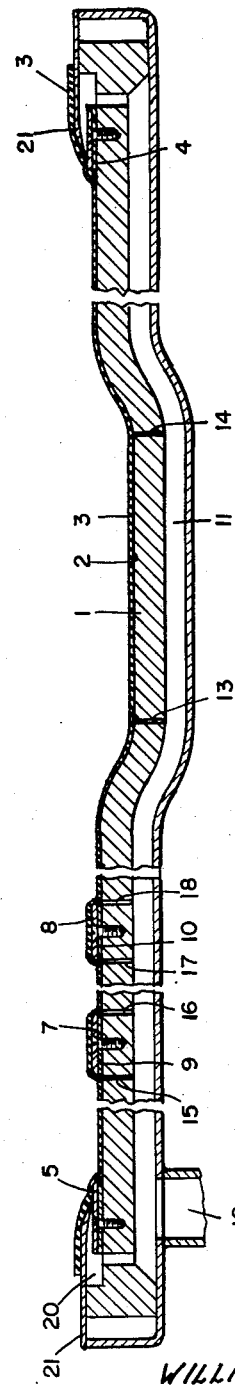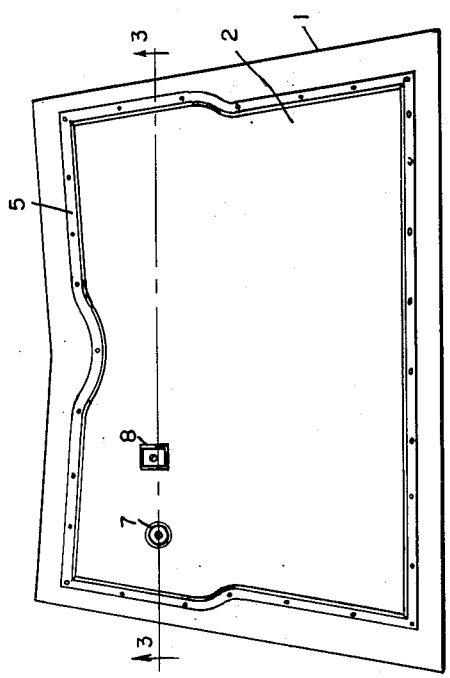

Patented Oct. 19, 1954

2,691,797

UNITED STATES PATENT OFFICE 2,691,797

METHOD AND APPARATUS FOR TRIMMING MOLDED ARTICLES

William Bertleff and Leon E. Hoffer, Willoughby, Ohio, assignors, by mesne assignments, to The Eagle-Picher Company, Cincinnati, Ohio, a corporation of Ohio Application February 10, 1950, Serial No. 143,454

17 Claims. (Cl. 18—19)

This invention relates as indicated to a method and apparatus for trimming molded articles and, more particularly, to such method and apparatus for trimming articles such as rubber floor mats and the like which are commonly molded in open molds, i. e. without the employment of co-acting mold members.

For convenience of illustration, the following description of our invention will refer particularly to the molding of rubber mats, but it will of course be appreciated that a very large variety of articles may be produced in a similar manner. The method of molding rubber floor mats, contoured rubber mats for automobiles, and the like commonly employed is to place a sheet or blank of the plastic rubber material upon a mold surface of desired conformation and then to force such blank into close molding contact with such surface by means of fluid pressure thereagainst. Usually a number of small vents will be provided in the mold surface by means of which a vacuum may be applied to draw the blank firmly against such surface. The entire mold may be enclosed within a steam cabinet and steam under pressure then admitted both to cure the molded article and to supplement the effect of the vacuum in insuring that the blank closely conforms to the mold surface.

When the cured molded article such as a floor mat has been stripped from the mold, it is next transported to a trimming machine usually of the "clicker" type including a properly shaped knife or flange adapted to be reciprocated to trim the periphery of the mat. Ordinarily some shrinkage in the mat area will take place subsequent to the curing operation so that it has generally been necessary to allow a certain amount of tolerance in the trimming operation. This has meant that the size of the blanks employed must be sufficiently large to allow for shrinkage and still cover the area defined by the trimming knife. The waste material comprising such trimmings or flash has consequently been excessive and unduly increased the cost of the molded articles which are generally of a type falling within a low price range. Furthermore, while molded articles of this nature are generally quite tear-resistant, it has been found that where thus trimmed they are quite susceptible to tearing and are sometimes even damaged in handling prior to shipment.

It is accordingly a primary object of our invention to provide a new method and apparatus for trimming molded articles which will trim such articles to the precise desired dimensions with a minimum of flash.

Another object is to provide a method and apparatus for trimming molded articles which will produce tear-resistant edges on such articles and reduce flash to a minimum.

Still another object is to provide such method and apparatus whereby such trimming may be achieved simultaneously with the molding operation, thereby eliminating the expense of a separate additional step in the production of such articles.

Other objects of our invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a top plan view somewhat diagrammatic in nature of a mold for forming a contoured automobile floor mat;

Fig. 2 is a vertical sectional view showing such mold supported in conventional manner within a steam chamber;

Fig. 3 is a vertical sectional view taken along the line 3—3 on Fig. 1;

Fig. 3A is an enlarged detail view of a portion of the mold of Fig. 3;

Fig. 4 is a top plan view of a mold generally similar to Fig. 1 but provided with a modified form of trimming element;

Fig. 5 is a vertical sectional view taken along the line 5—5 on Fig. 4;

Fig. 6 is a fragmentary detail view similar to Fig. 5 but showing a slightly different form of trimming element; and Fig. 7 illustrates another embodiment utilizing a combination knife edge and vacuum seal.

Referring now more particularly to said drawing and especially Figs. 1–3A thereof, the apparatus of our invention includes a hollow mold 1 having an upper molding surface 2 upon which a sheet or blank 3 of uncured rubber composition or like plastic material (e. g. neoprene, vinyl plastic, etc.) may be placed. A narrow flat space strip 4 is secured to such upper surface adjacent the outer periphery of the latter and a flat knife edge 5 is mounted thereon having a beveled edge portion 6 extending inwardly over the mold surface beyond the inner edge of the spacer strip. Where cut out openings are desired in the mat, flat knives such as 7 and 8 of desired peripheral shape are secured to the mold but slightly spaced from surface 2 thereof by means of flat spacer elements 9 and 10 respectively. The beveled edges of the knives similarly extend slightly beyond the peripheries of their spacer elements.

As shown in Fig. 3, mold 1 is provided with a chamber 11 having an outlet 12 by means of which vacuum may be applied thereto. As is conventional practice in such molds, small vents such as 13 and 14 extend from chamber 11 to outer mold surface 2, particularly to any depressed areas of such surface. Similar vents such as 15, 16, 17 and 18 extend from chamber 11 to mold surface 2, penetrating the latter directly underneath the overhanging beveled knife edges of trimming elements 7 and 8. A plurality of such vents preferably rather closely spaced will ordinarily be thus provided beneath such knife edges.

As best shown in Fig. 3A, the upper surface of peripheral spacer strip 4 is grooved as at 19 at closely spaced intervals to provide vents extending from the region directly beneath the overhanging peripheral knife edge 6 and communicating with an annular peripheral passage 20 which in turn communicates with chamber 11. A flexible peripheral beveled vacuum plate 21 extends inwardly over knife 5 and is adapted to be drawn down thereagainst when vacuum is applied to chamber 11 and passage 20.

As shown in Fig. 2, the above-described mold assembly will ordinarily be enclosed within a curing chamber 22 comprising a base 23 and a hood or cover 24, gasket 25 providing a seal therebetween. Steam, hot air, or other fluid curing medium may be introduced to chamber 22 through inlet 26.

In operation, the blank 3 of plastic sheet material is placed upon mold surface 2 and vacuum is applied to chamber 11. Such vacuum is first effective through peripheral passage 20 to effect a seal where the blank overlies knife 5 and vacuum plate 21 and such vacuum plate is drawn down against the upper surface of knife 5 as shown in Figs. 3 and 3A. The vacuum is also effective through vents such as 13 and 14 to draw the blank into close molding contact with the upper mold surface 2. The vents such as grooves 19 beneath knife 5 and vents such as 15, 16, 17 and 18 beneath the overhanging peripheral edges of knives 7 and 8 serve to cause the plastic material to be drawn against and beneath such knife edges. With plastic material of the consistency normally employed in the formation of mats and the like, the beveled knife edges do not quite entirely penetrate the same but very nearly do so. Hood 24 has in the meantime been moved into position, and steam or the like is introduced to chamber 22 to cure the mat. When the curing operation has been completed, the hood is raised, the vacuum is discontinued, and the cured mat is stripped from the mold. The flash extending peripherally outwardly from knife edge 6 and overlying knives 7 and 8 adheres to the molded article to a sufficient extent that it may be removed from the mold with the latter but is then readily detached from the mat proper. Since the edges of such mat were molded against the spacer elements underlying the respective knife edges, they are much more tear-resistant than when such mat edges have been trimmed in conventional manner.

Referring now more particularly to Figs. 4-6 inclusive of the drawing, a modified form of mold construction is there illustrated. In this embodiment the peripheral knife edge 27 may be normal to the mold surface 2 and small vents 28 lying closely adjacent the inner and outer faces of such knife extend from surface 2 to inner chamber 11. To provide a circular cut-out in the mat, a circular knife 29 cylindrical in form is inset in the mold surface and provided with inner and outer vents 30 extending from such surface to chamber 11. A plurality of such vents 30 are provided closely adjacent such upstanding knife edge to insure that the rubber blank or similar plastic sheet material is drawn down closely against the upper mold surface 2 in close proximity to such knife. A large number of vents 28 are likewise provided closely adjacent upstanding knife 27. Such knife edges will preferably be beveled with the bevel inclined toward that portion of the sheet material which is to be trimmed away, and when suction is applied to chamber 11 and the sheet material drawn down against such knife edges the material is ordinarily nearly, but not quite, severed and the sides of the upstanding knife edges serve in effect as a mold edge against which the sheet material is molded and cured. It is, of course, the under surface of such sheet material which receives the contour and pattern of mold surface 2 and which will become in use the upper surface of the mat. When the flash has been removed from the mat, it will accordingly be seen that the latter is provided with a molded slightly downturned tear-resistant edge. While the vacuum plate 21 is also illustrated in the Fig. 5 embodiment, the use of vacuum plates of this type being conventional, we have found that it is frequently not necessary to employ the same and that a prompt and adequate seal may be obtained around the peripheral knife edge 27 when vacuum is applied to chamber 11. When the blank to be molded is of relatively stiff though plastic material, the employment of such vacuum plate may, however, be found to be advantageous.

Fig. 6 illustrates a further modification showing still another form of trimming knife 31 suitable for our purposes. In this instance, the knife, while generally resembling knife 27, includes an outwardly angularly disposed portion of vertical extent substantially the same as the thickness of blank 3 and a further upwardly extending beveled trimming portion. A large number of small vents 32 disposed immediately adjacent such knife to either side thereof communicate with vacuum chamber 11 similarly to vents 28. When suction is now applied and blank 3 is drawn against mold surface 2, it will be seen that the portion of the blank against the outwardly sloping face of knife 31 will be molded on a beveled contour so that when the flash 33 is separated from the finished article the latter will have a downwardly and outwardly beveled molded edge.

As shown in Fig. 7, the vacuum plate 21 and knife 5 of the Fig. 3 embodiment may be combined in the form of a single flexible knife-edged plate or blade 34 secured to mold 1 at its outer periphery with its beveled edge projecting slightly inwardly past rib 35. When a sheet of rubber composition or the like is placed in the mold with its edges overlying plate 34 and suction applied, such blade is first drawn down against rib 35 and then suction acting through vents 36 further serves to draw the plastic material past and under the overhanging knife edge. This arrangement reduces flash to a minimum and permits a variety of shaped edges to be produced.

While, as will be seen from the foregoing, the knife does not ordinarily entirely penetrate the blank of sheet material, nevertheless it very nearly does so and the small amount of such material initially overlying the knife is attenuated, when suction is applied, to such an extent that the very slight lip remaining at the edge of the mat after removal of the flash is inconsequential both from the point of view of appearance and from the point of view of tear-resistance.

We have achieved the objects of our invention in a very simple manner which, however, enables the molding of articles such as rubber floor mats and the like without the necessity of a separate special trimming operation and simultaneously affords an improved tear-resistant edge. All articles produced in the same mold in the manner taught above will be identical without the usual variations resulting from differential shrinkage and the like prior to the ordinary trimming operation. By employing knives of selected contours such as, for example, knife 34 of Fig. 6, beveled or scalloped edges may be obtained having an improved ornamental appearance and less likely to be engaged and caught by the shoes of persons walking thereover. Metal retaining strips may also be employed, overlying such beveled edge portions to protect the mat and hold the same in place without, however, projecting above the general level of the mat. We are aware that it is known to provide mold sections with knife edges so that upon closing of the mold the flash will be trimmed. In our new mold, however, the sheet material is trimmed without movement of mechanical parts and the trimming elements themselves then constitute a border against which the trimmed edge is molded. Depending on the type of finished edge desired, the trimming knives may lie in a horizontal plane as shown in Fig. 3A, further exemplifying the manner in which our new method differs from prior shearing methods.

We apply fluid pressure directly on the blank of plastic sheet material to force the same against the knife edge, it being understood that the pressure differential thus employed may be obtained by employment of suction to the underside of the sheet or fluid pressure, such as steam pressure, on the other side, or both. Hot water may even be employed under pressure to force the blank against the knife and mold surface in certain applications. In addition to trimming operations, where the knife may or may not cut entirely through the blank (it facilitates removal from the mold if the sheet remains sufficiently together to be stripped in one piece) the knife may be used to make cuts or slits in the article, as frequently desired in automobile floor mats.

Of course, if desired, the flash may be stripped while the mat or other article is still in the mold and prior to the curing operation, thus salvaging uncured material for re-use. A small hand roller may often be of assistance, being run along the knife edge to completely sever the flash from the remainder of the article.

Other modes of applying the principle of the invention may be employed, change being made as regards the details described, provided the features stated in any of the following claims or the equivalent of such be employed.

We therefore particularly point out and distinctly claim as our invention:

1. The method of molding a blank of plastic sheet material which comprises drawing such sheet against a mold surface and knife edge by means of vacuum, thereby causing such sheet to conform to such surface and such knife substantially but not entirely to penetrate such sheet; curing such molded sheet, stripping such cured sheet from such mold surface and knife, and then separating such sheet along the line of penetration by such knife.

2. The method of molding a rubber mat or the like which comprises drawing a blank of plastic sheet material against a mold surface and a peripherally disposed knife edge by means of suction, thereby causing such sheet to conform to such mold surface and such knife substantially but not entirely to penetrate such sheet around the periphery of such surface, curing such molded sheet in situ, stripping such cured sheet from such mold surface and knife, and then separating such molded sheet from the peripheral flash along the line of penetration by such knife.

3. The method of molding a rubber mat or the like which comprises drawing a blank of plastic sheet material against a mold surface and a peripherally disposed upstanding knife edge by means of suction, thereby causing such sheet to conform to such mold surface and such knife substantially but not entirely to penetrate such sheet around the periphery of such surface to form a molded edge for such mat, curing such molded sheet in situ, stripping such cured sheet from such mold surface and knife, and then separating such molded sheet from the peripheral flash along the line of penetration by such knife.

4. The method of trimming plastic sheet material which comprises placing such sheet across a knife edge, and applying suction to such sheet on each side of such knife edge to draw such sheet against the same.

5. The method of trimming plastic sheet material which comprises placing such sheet across an upstanding knife edge generally normal to such sheet, and applying suction to such sheet closely adjacent each side of such knife edge to draw such sheet against the same.

6. The method of trimming plastic sheet material which comprises placing such sheet across a knife edge lying in a plane generally parallel to the plane of such sheet, and applying suction to the region directly beneath such knife edge to draw such sheet material thereagainst.

7. In apparatus for molding relatively thin plastic articles such as rubber mats and the like, such apparatus including a mold having a vented mold surface for application of suction thereto; the combination of a peripheral upstanding knife edge surrounding such surface and having suction vents disposed closely adjacent each side thereof.

8. In apparatus for molding relatively thin plastic articles such as rubber mats and the like, such apparatus including a mold having a vented mold surface for application of suction thereto; the combination of a peripheral knife edge surrounding such surface and disposed in a plane generally parallel to the latter but slightly spaced therefrom, said knife edge being directed inwardly, and suction vents disposed beneath said knife edge.

9. In apparatus for molding relatively thin plastic articles such as rubber mats and the like, such apparatus including a mold having a vented mold surface for application of suction thereto; the combination of a fixed peripheral knife edge directly surrounding and defining such surface, and suction vents closely adjacent both sides of said knife edge within the region circumscribed thereby.

10. In apparatus for molding relatively thin plastic articles such as rubber mats and the like, such apparatus including a mold having a vented mold surface for application of suction thereto; the combination of a peripheral knife edge surrounding such surface adapted to trim a blank of plastic sheet material overlying the same and such mold surface, suction vents closely adjacent said knife edge within the region circumscribed thereby, a second continuous knife edge within the region of such surface adapted to define an opening to be formed in such blank, and suction vents closely adjacent said second knife edge to the side thereof away from such defined opening.

11. In apparatus for molding relatively thin plastic articles such as rubber mats and the like, such apparatus including a mold having a vented mold surface for application of suction thereto; the combination of a continuous knife edge within the region of such surface adapted to define an opening to be formed in a blank of plastic sheet material overlying the same and such mold surface, and suction vents closely adjacent said knife edge to the side thereof away from such defined opening.

12. In apparatus for molding plastic sheet material, such apparatus including a mold having a vented mold surface for application of suction thereto; the combination of a peripheral vacuum plate surrounding such surface and disposed in a plane generally parallel thereto, said plate being secured to such mold adjacent its outer periphery and provided with a knife edge about its inner periphery, a peripheral rib on such mold underlying said plate and normally slightly spaced therefrom, with such knife edge projecting inwardly therepast, channels leading beneath said plate for application of suction to draw said plate down against said rib when overlaid by plastic sheet material, and suction vents in such mold surface adjacent such knife edge.

13. In apparatus for molding plastic sheet material, such apparatus including a mold having a vented mold surface for application of suction thereto; the combination of a peripheral vacuum plate surrounding such surface and disposed in a plane generally parallel thereto, said plate being secured to such mold adjacent its outer periphery and provided with a knife edge about its inner periphery, and such knife edge projecting inwardly over such mold surface.

14. The method of molding a blank of plastic sheet material which comprises drawing such sheet against a mold surface and knife edge by means of vacuum, thereby causing such sheet to conform to such surface and such knife substantially to penetrate such sheet, applying a pressure tool to such sheet where thus substantially penetrated by such knife to completely sever such sheet, removing the severed portion of such sheet from one side of such knife, curing the remaining portion of such sheet in situ in such mold, and stripping such cured and molded sheet portion from such mold.

15. The method of molding a blank of plastic sheet material which comprises drawing a blank of plastic sheet material against a mold surface and a peripherally disposed knife edge by means of suction, thereby causing such sheet to conform to such mold surface and such knife to penetrate such sheet around the periphery of such surface, applying a pressure tool to such sheet where thus penetrated by such knife completely to sever the outer flash from the molded sheet encompassed thereby, removing such flash, and curing such molded sheet in situ in such mold.

16. The method of molding a blank of plastic sheet material which comprises drawing such sheet against a mold surface and inclined knife edge by means of differential fluid pressure on the respective sides of such sheet, thereby causing such sheet to conform to such surface and such knife substantially to penetrate such sheet, curing such molded sheet, and then stripping such cured sheet from such mold surface and knife, with such sheet having an inclined slit therein formed by such knife.

17. In apparatus for molding relatively thin plastic articles such as rubber mats and the like, such apparatus including a mold having a vented mold surface for application of suction thereto; the combination of an upstanding knife edge extending above such surface and adapted substantially to penetrate a sheet of plastic material resting against such surface, said knife edge having a laterally offset portion adapted thereby to form a correspondingly offset slit in such sheet material, and suction vents in such surface adjacent said knife edge.

References Cited in the file of this patent

UNITED STATES PATENTS

| Number | Name | Date |
|---|---|---|
| 289,923 | Miles | Dec. 11, 1883 |
| 724,609 | Peters | Apr. 7, 1903 |
| 1,190,072 | Aiken | July 4, 1916 |
| 1,353,077 | Smith | Sept. 14, 1920 |
| 2,120,328 | Ferngren | June 14, 1938 |
| 2,133,445 | Guerin | Oct. 18, 1938 |
| 2,155,445 | Pittenger et al. | Apr. 25, 1939 |
| 2,493,439 | Braund | Jan. 3, 1950 |